United States Patent Office 3,452,645
Patented July 1, 1969

3,452,645
MONITORING OF CONTROL SYSTEMS
Richard Kenneth Barltrop, Lewisham, London, England, assignor to Elliott Brothers (London) Limited, London, England
Filed June 13, 1966, Ser. No. 557,092
Claims priority, application Great Britain, June 18, 1965, 26,007/65
Int. Cl. F15b 9/09, 13/044
U.S. Cl. 91—363          8 Claims

ABSTRACT OF THE DISCLOSURE

Monitoring apparatus for monitoring the operation of a control system which produces a control output in response to a control demand input. The apparatus has a comparator to which the outputs of the control output and the control input demand are fed. The apparatus also includes restricting means for restricting the output of the control output and inactivating means for inactivating the output of the control output. When a predetermined amount of discrepancy occurs between the control input demand and the control output, the comparator actuates the restricting means, and when a further predetermined amount of discrepancy greater than said predetermined amount occurs, the comparator actuates the inactivating means.

---

The invention relates to the monitoring of control systems.

According to one aspect of the invention monitoring apparatus, capable of monitoring the operation of a control system which produces a control output in response to a control demand input, comprises a comparator capable of comparing signals representative of a control input demand with signals representative of a control output, restricting means and inactivating means, said comparator being arranged to operate the restricting means, which is effective to cause the control output to be reduced in effectiveness, upon a predetermined amount of discrepancy being determined between the control input demand and the control output and said comparator being arranged to operate the inactivating means, which is effective to cause the control output to be completely ineffective upon a further predetermined amount of discrepancy greater than said predetermined amount, being determined between the control input demand and the control output.

Preferably there are provided delay means connected at the input to the comparator so that the control input demand signals are fed to the comparator therethrough, the delay of the delay means being equivalent to that of the control system. The delay means may be controllable in response to signals from the comparator, the arrangement being such that during normal operation of the control system the delay of the delay means is equivalent to the normal delay of the control system and when the comparator is effective to operate the restricting means of the control output the transfer function of the delay means is altered so that the delay thereof corresponds with the altered delay of the control system.

In one embodiment of the invention the control system includes a hydraulic actuator arranged to produce an output movement of a member coupled thereto, a hydraulic actuating system including a control valve and valve input means operative to control the hydraulic actuator in response to input demand signals applied to the input means, the actuating system including a further valve controllable by said comparator to reduce the effectiveness of said control valve upon determination of said predetermined amount of discrepancy. Said further valve may be a throttle valve arranged to act directly on the control valve to reduce its effectiveness.

The inactivating means is a third valve effective on operation to cause the control valve to be completely ineffective, the third valve being controlled by the comparator to operate upon determination of said further predetermined amount of discrepancy. The third valve may be a by-pass valve arranged on operation to by-pass the hydraulic actuator.

Preferably the aforesaid valve input means comprises a servo loop including an amplifier fed with said input demand signals and with feedback signals representative of the output of the hydraulic actuator, the output of the amplifier being error signals representative of any difference between the desired actuator output and the actual actuator output, which error signals are applied to control the control vlave.

The foregoing and further features of the invention will become apparent from the following description of a preferred embodiment thereof with reference to the accompanying drawings, in which.

Figure 1:
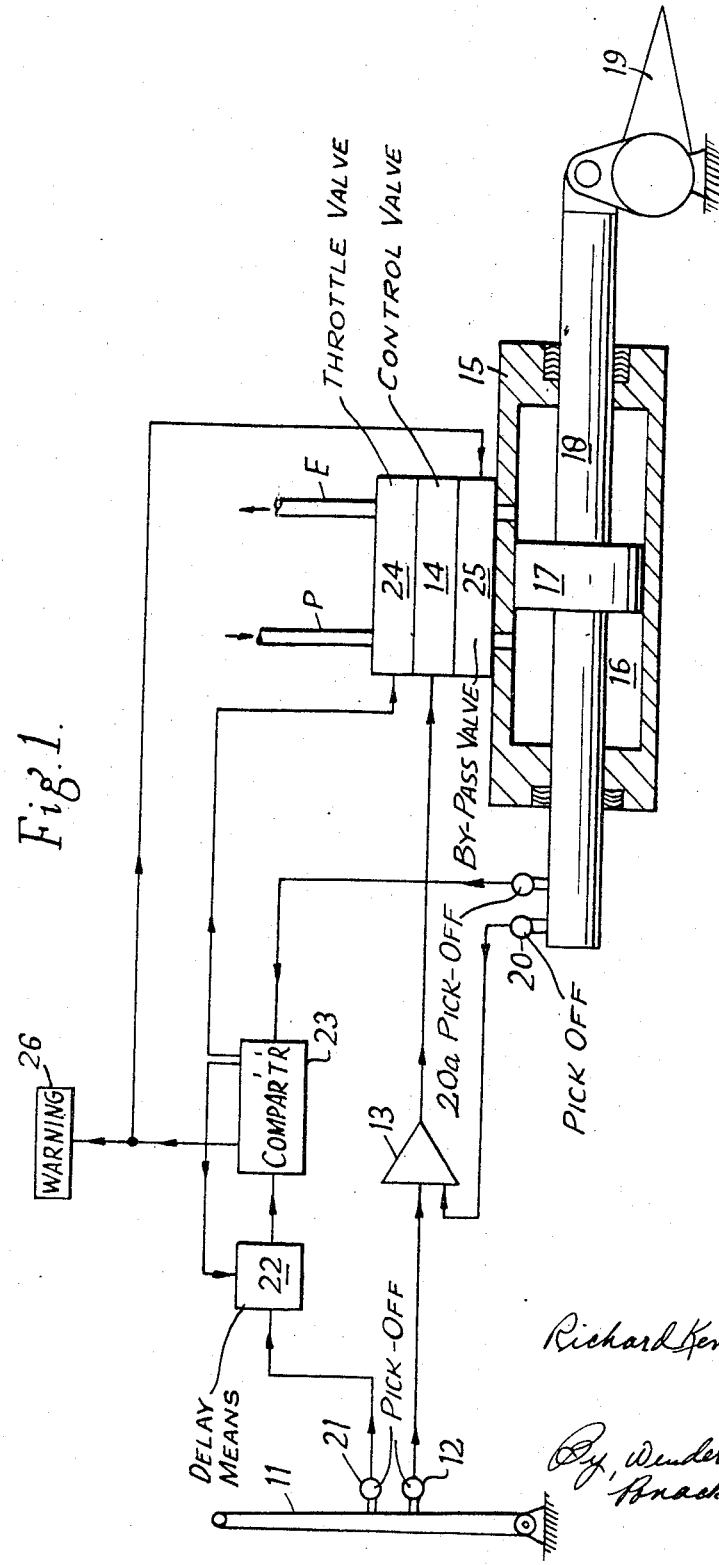
FIGURE 1 shows a diagrammatic representation of a monitored control system for controlling the elevator of an aircraft.

Referring now to FIGURE 1 there is shown a control system for controlling the elevators of an aircraft. A manually operable control lever 11 has associated therewith a pick-off device 12 which senses the position of the manually operable lever 11 and is connected to provide corresponding electrical position signals as an input to an amplifier 13. The output of amplifier 13 is connected so as to provide positional control signals to a torque motor/control valve combination 14 associated with a hydraulic actuator 15.

The hydraulic actuator 15 comprises a cylinder 16 containing a piston 17 having a piston rod 18 which is mechanically linked to control the position of an elevator 19. A pick-off device 20 which is arranged to provide electrical output signals representative of the position of the piston rod 18 is connected so as to feed such positional signals as a further input to amplifier 13. Thus there is provided a servo loop system, the output of amplifier 13 being reduced to zero when the piston rod 18 reaches a required position.

A further pick-off 21 is associated with the manually operable lever 11 and produces electrical output signals representative of the position of the manually operable lever 11. The output from pick-off 21 is fed via delay means 22 as one input to a comparator 23. A further pick-off 20a arranged to provide electrical output signals representative of the position of the piston rod 18 is connected so as to provide a further input for the comparator 23. The delay means 22 is arranged to provide a transfer function equivalent to the transfer function in the control system and hence the two sets of electrical positional signals that are fed to the comparator 23 have similar amplitudes in the normal operation of the system when no fault is present. The comparator 23 is connected so as to control the operation of a throttle valve 24 which is connected between the torque motor/control valve combination 14 and pressure input and exhaust lines references P and E respectively which provide the hydraulic power for operation of the actuator 15. The comparator 23 is also connected to the delay means 22.

The comparator 23 is also connected so as to control a by-pass valve 25 which is interposed between the control valve 14 and the hydraulic actuator 15 and at the same time connected to a visible and/or audible warning indicator 26.

Figure 4:
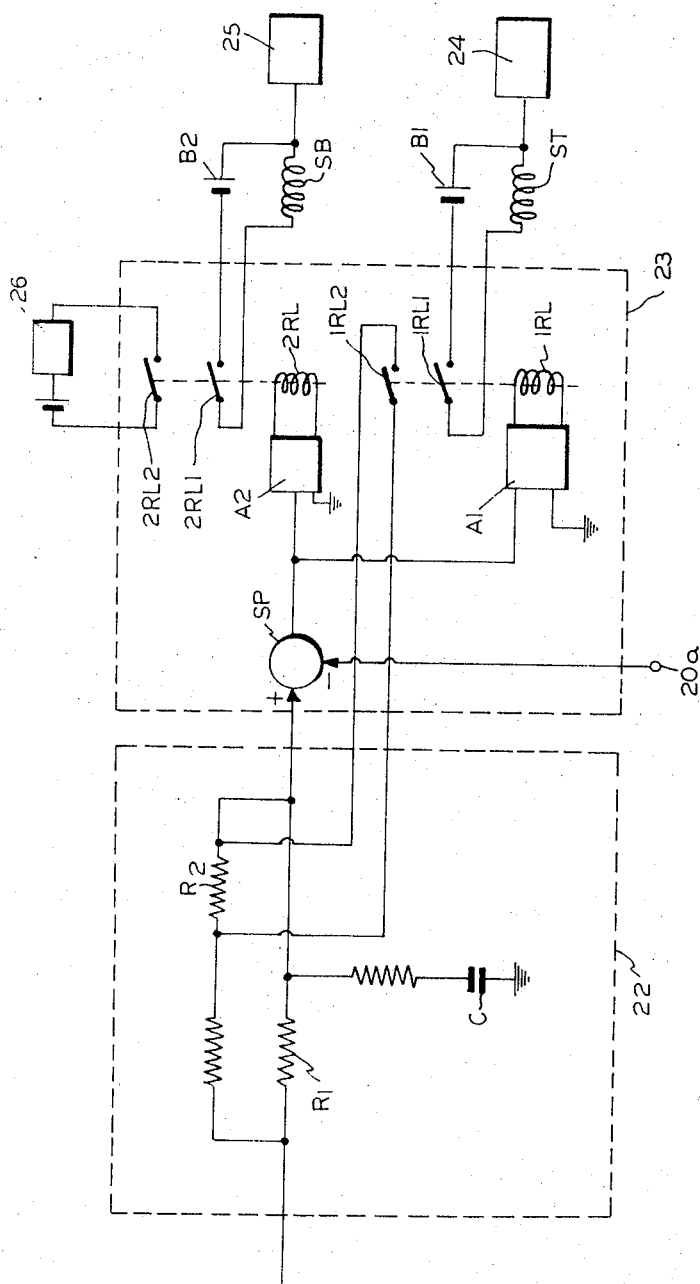
FIGURE 4 is a schematic circuit diagram of a delay means and a comprator.

As seen in FIG. 4, one form of delay means which will function to meet the requirements of the present invention is a variable delay circuit which comprises basically an RC network comprising a resistor R1 and a capacitor C and having in parallel with resistor R1 a resistive chain including a further resistor R2 which is capable of being short circuited by means of a relay contact 1RL1. When the contact is closed, R2 is effectively out of circuit and the time constant of the delay circuit is therefore shorter.

One form of comparator 23 which can be used comprises a summing point SP taking one input from the delay circuit and the other input from pick off 20A. The difference between the two inputs is applied to two relay amplifiers A1 and A2 which are effective respectively to operate relays 1RL and 2RL. When the error signal from the summing point SP exceeds a first level, amplifier A1 triggers relay 1RL to close its contacts 1RL1 and 1RL2. Thus, the delay time of the delay circuit 22 is varied and simultaneously the throttle valve 24 which is operated by a solenoid ST and a battery B1 is closed.

Relay amplifier A2 is set to a different level from A1 and operates only when the level of the error signal exceeds a second higher level. At this time relay contacts 2RL1 and 2RL2 are closed, thereby operating respectively the bypass valve 25, through a battery B2 and a solenoid SB and the warning device 26.

Figure 5:
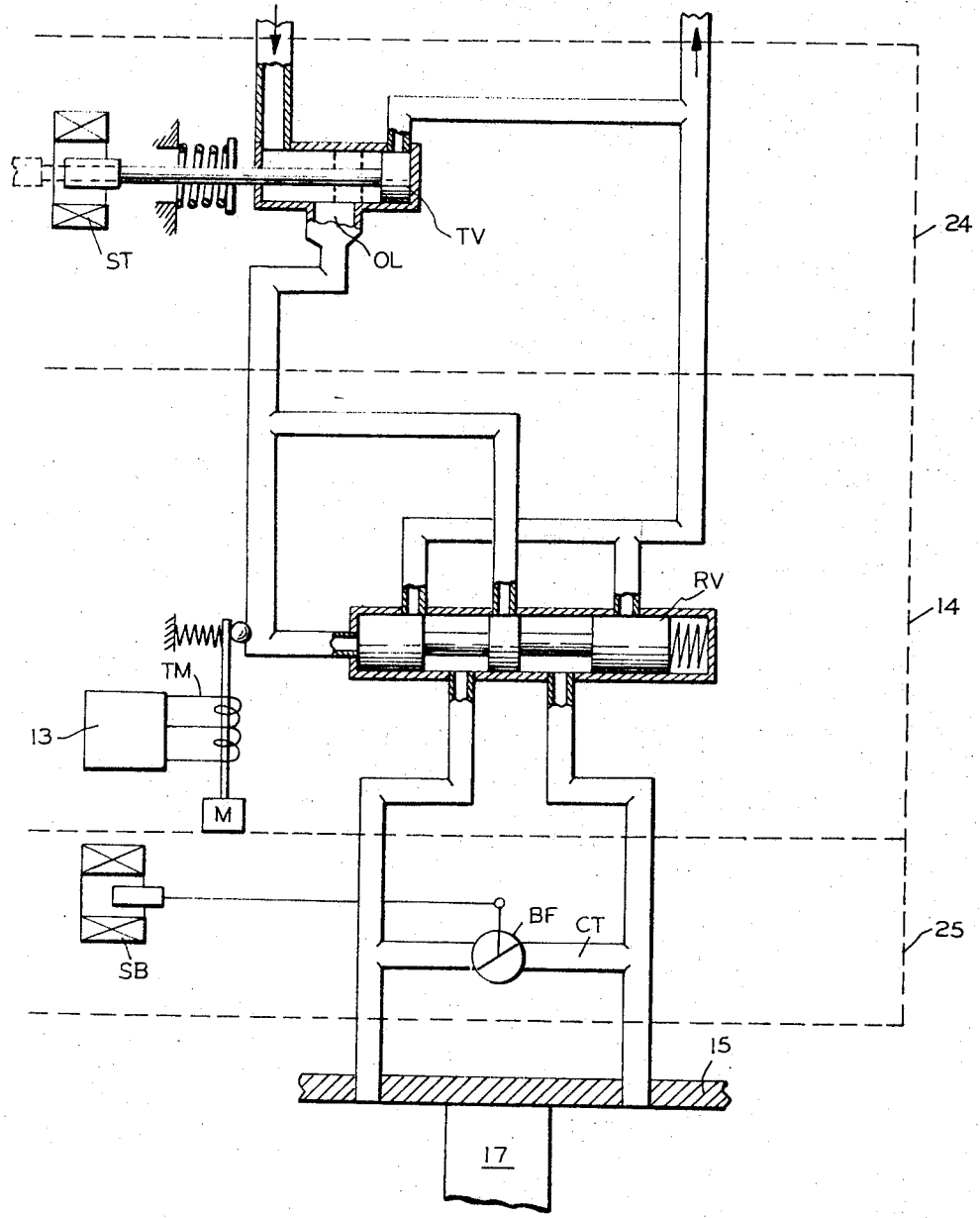
FIGURE 5 is a schematic diagram of a throttle valve, control valve and bypass valve.

FIGURE 5 shows one possible arrangement of valves 24, 14 and 25 which can be used. Valve 24 is a spool type throttle valve which is normally spring biased to the position shown in full line and which is operated by energisation of solenoid ST to be moved to the position shown in broken line where it partly obstructs the outlet OL. The control arrangement 14 comprises a torque motor TM operated by the output from amplifier 13 and a conventional spool type regulating valve RV.

The bypass valve 25 is a butterfly valve BF mounted in a conduit CT which connects the input and output ports of the actuator 15. The butterfly valve is normally closed but is opened on energisation of solenoid SB.

In operation of the system movement of the manually operable member 11 produces an elevator demand signal which is fed from the pick-off 12 to the amplifier 13. This signal is fed via the torque motor/control valve combination 14 to control the position of the piston 17 in the chamber 16 and hence the position of elevator 19 via the piston rod 18. Positional signals representative of the position of the piston rod 18 are fed back to the amplifier 13 and when the elevator 19 is in the required position the output signals from the amplifier 13 are reduced to zero. At the same time a comparison demand signal is fed from the pick-off 21 via the delay means 22 to the comparator 23. This comparison demand signal is compared with the positional signals from pick-off 20a.

When the comparator 23 determines an error above a predetermined amount between the two sets of positional signals fed thereto it causes the throttle valve 24 to reduce the pressure lead P so reducing the flow and hence the effectiveness of torque/motor control valve 14 and reducing the rate of movement of elevator 19. At the same time the comparator 23 varies the delay means 22 such that the difference between the elevator demand signal and the positional signals representative of the position of the piston 18 caused by the throttle valve is compensated for. The reason for this is described later.

When the error between the comparison demand signals and the position signals from pick-off 20a increase above a predetermined higher value the comparator 23 causes the by-pass valve 25 to connect the two sides of the chamber 16, which are divided by the piston 17, together and hence disconnects the control system from controlling the position of elevator 19. At the same time the warning indicator 26 is actuated to show that the control system has been disconnected.

Figure 2:
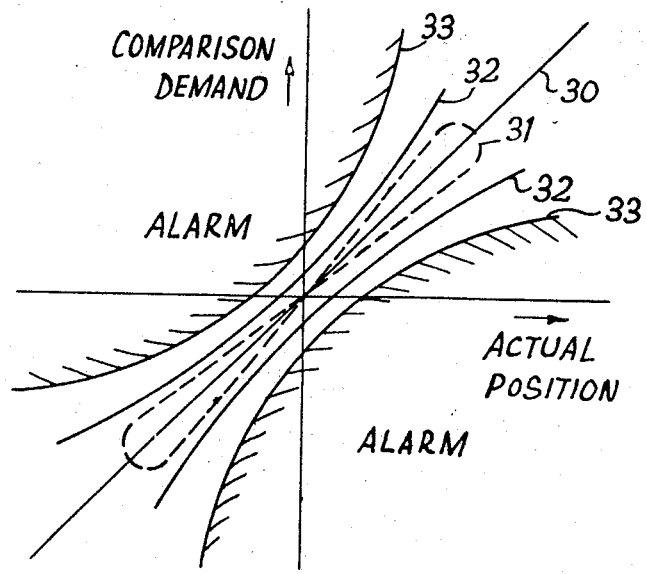
FIGURE 2 shows a graphical representation of the characteristics of the monitored system of FIGURE 1.

Referring now to FIGURE 2 there is shown a graphical representation of a suitable characteristic of the comparator of the monitoring system of FIGURE 1 in which comparison demand signal is plotted against actual position signal. The operating point of the system is represented by the straight line locus 30 but due to dynamic tolerances this is more accurately represented typically by the figure of eight dotted locus 31. Whilst the locus of the system operating point remains in the area between the lines 32 the system is considered to be operating normally but when the locus of the system operating point crosses the lines 32 into one of the areas defined between the lines 32 and lines 33 then the throttle valve 24 is actuated. If now the locus of the system operating point crosses the lines 33 into one of the shaded zones the by-pass valve 25 is operated and a warning indication given.

A special case arises when the equipment is working in a safe manner but due to an unusually large dynamic tolerance or an unusually fast input demand the system operating point locus 31 crosses lines 32 causing the throttle valve 24 to be operated and hence reducing the rate of response of the output. Under these circumstances if no compensation was applied to the time delay 22 by comparator 23, the locus of the system operating point would move sharply and cross the line 33 (FIGURE 2) and the system would disconnect unnecessarily and in a nuisance manner. By applying compensation to delay 22 in the manner previously described the locus of the operating point is prevented from crossing line 33 for as long as the output continues to follow the demand.

Figure 3:
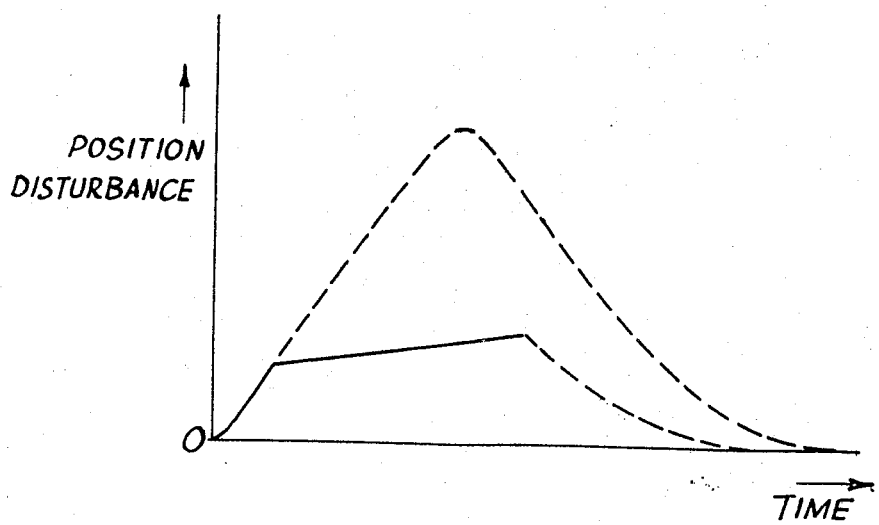
FIGURE 3 shows a graphical representation of the operation of the control system of FIGURE 1 when a fault occurs.

Referring now to FIGURE 3 there is shown graphically the form of the output disturbances of elevator 19 resulting from a failure of the system, output position being plotted against time and it being assumed that the input demand is at null. When a hardover failure occurs in the control system, the output accelerates to maximum rate, until the comparator threshold operating point crosses into the region between lines 32 and 33 (FIGURE 2). The throttle valve 24 is then actuated and the output runaway rate is reduced to a preset low figure. The output continues to move slowly until the system operating point crosses the line 33 (FIGURE 2) into the alarm zone and after the system operating point has been in this alarm zone for a predetermined set time the by-pass valve 25 is actuated to provide disconnection of the control system and a warning is given. The output then returns to zero.

The dotted line on FIGURE 3 shows the amount of output disturbance which would be incurred if the throttle valve 24 was not included in the system and the output allowed to continue at the maximum rate until the system operating point had been in the alarm zone for the preset time. It will be seen from this comparison that the proposed arrangement hereinbefore described substantially reduces the amount of disturbance of the elevator when a fault occurs.

I claim:
1. Monitoring apparatus for monitoring the operation of a control system which produces a control output in response to a control demand input comprising a comparator for receiving and comparing signals representative of a control input demand with signals representative of a control output, restricting means for restricting the output of said control output and inactivating means for inactivating the output of said control output, said comparator being coupled to said restricting means to activate said restrictive means to cause the control output to be reduced in effectiveness upon a predetermined amount of discrepancy being determined between the control input demand and the control output, and said comparator being coupled to said inactivating means to activate said inactivating means to cause the control output to be completely ineffective upon a further predetermined amount of discrepancy greater than said predetermined amount, being determined between the control input demand and the control output.

2. Apparatus as claimed in claim 1, further comprising delay means connected at the input to the comparator and through which the control input demand signals are fed to the comparator, the delay of the delay means being equivalent to that of the control system.

3. Apparatus as claimed in claim 2, wherein the delay means is a controllable delay means having the transfer function controllable, the delay means having a control connection to the comparator for controlling the transfer function thereof in response to signals from the comparator, the arrangement being such that during normal operation of the control system the delay of the delay means is equivalent to the normal delay of the control system and when the comparator is effective to reduce the effectiveness of the control output the transfer function of the delay means is altered so that the delay thereof corresponds with the altered delay of the control system.

4. Apparatus as claimed in claim 1, wherein the control system includes a hydraulic actuator arranged to produce an output movement of a member coupled thereto, a hydraulic actuating system including a control valve and valve input means operative to control the hydraulic actuator in response to input demand signals applied to the input means, said restricting means comprising a further valve controllable by said comparator to reduce the effectiveness of said control valve upon determination of said predetermined amount of discrepancy.

5. Apparatus as claimed in claim 4, wherein said further valve is a throttle valve coupled to the control valve to act directly on the control valve to reduce its effectiveness.

6. Apparatus as claimed in claim 4, wherein the inactivating means is a third valve effective on operation to cause the control valve to be completely ineffective, the third valve being controlled by the comparator to operate upon determination of said further predetermined amount of discrepancy.

7. Apparatus as claimed in claim 6, wherein said third valve is a by-pass valve connected to the control valve and when it is actuated it by-passes the hydraulic actuator.

8. Apparatus as claimed in claim 4, wherein the valve input means comprises a servo loop including an amplifier fed with said input demand signals and coupled to the hydraulic actuator for being supplied with feedback signals representative of the output of the hydraulic actuator, the output of the amplifier being coupled to the control valve to feed thereto error signals representative of any difference between the desired actuator output and the actual actuator output, which error signals control the control valve.

References Cited

UNITED STATES PATENTS

| | | | |
|---|---|---|---|
| 2,969,773 | 1/1961 | Henry | 91—363 |
| 3,095,784 | 7/1963 | Colhoun. | |
| 3,190,185 | 6/1965 | Rasmussen. | |
| 3,279,323 | 10/1966 | Asche. | |

PAUL E. MASLOUSKY, *Primary Examiner.*

U.S. Cl. X.R.

91—1, 437, 461